Figure 1:
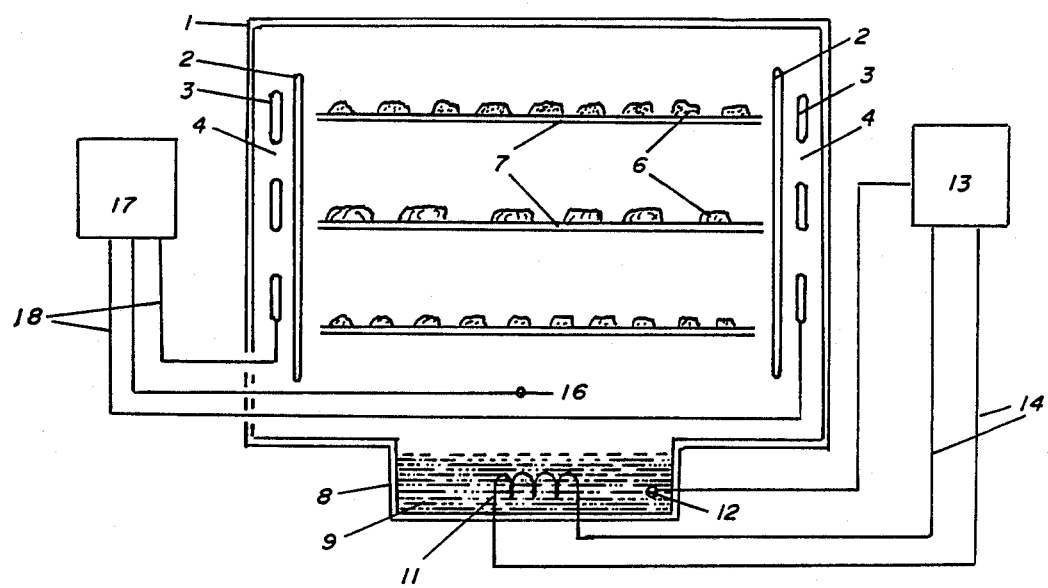

United States Patent [19]

Loeb

[11] Patent Number: 4,770,888
[45] Date of Patent: Sep. 13, 1988

[54] COOKING TREATMENT PROCESS

[75] Inventor: Leo Loeb, Louisville, Ky.

[73] Assignee: Properties Leasing Company Inc., Louisville, Ky.

[21] Appl. No.: 818,023

[22] Filed: Jan. 13, 1986

[51] Int. Cl.$^4$ ............................................. A23L 3/16
[52] U.S. Cl. .................................. 426/520; 426/509; 426/523
[58] Field of Search ............... 426/523, 508, 509, 520; 219/400, 401; 126/20

[56] References Cited

U.S. PATENT DOCUMENTS

| | | | |
|---|---|---|---|
| 3,424,231 | 1/1969 | Truhan | 219/400 |
| 4,244,979 | 1/1981 | Roderick | 426/523 |
| 4,506,598 | 3/1985 | Meister | 426/523 |
| 4,623,780 | 11/1986 | Shelton | 219/400 |

Primary Examiner—George Yeung
Attorney, Agent, or Firm—Edward M. Steutermann

[57] ABSTRACT

Food treating processes to be conducted in an enclosure having control means to control the humidity of the atmosphere in the enclosure as well as the temperature in the enclosure to provide selected effects in the food where in general the temperature of water in a reservoir is maintained at a temperature no greater than the air temperature in the enclosure.

10 Claims, 3 Drawing Sheets

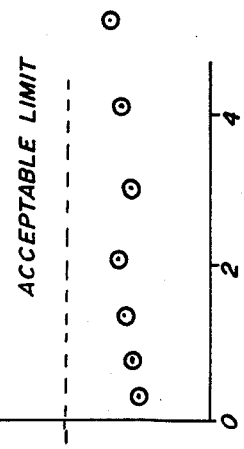
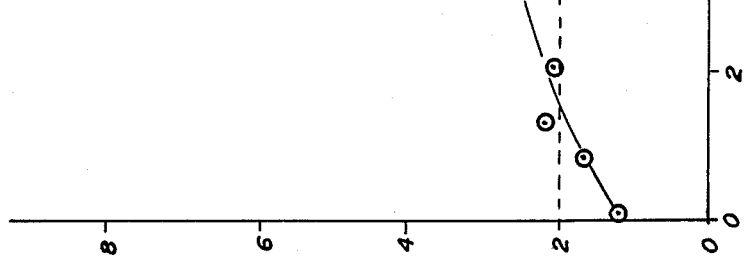

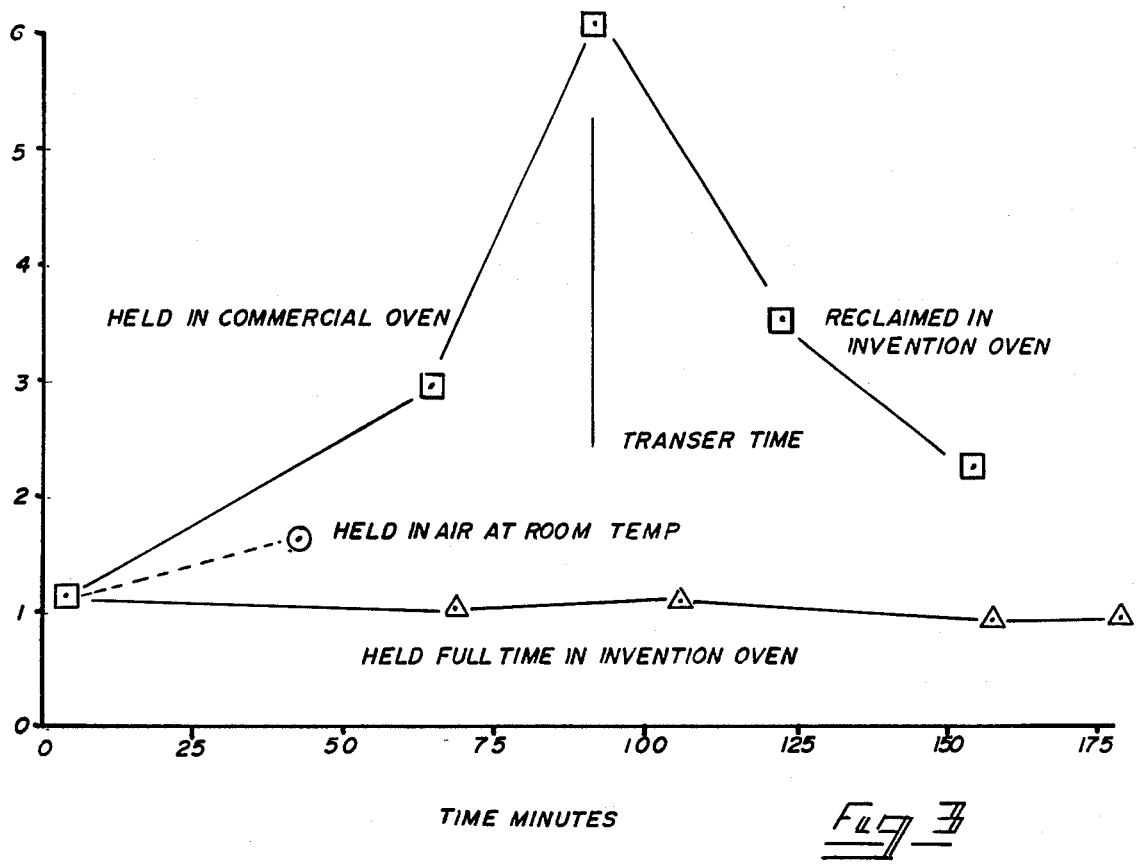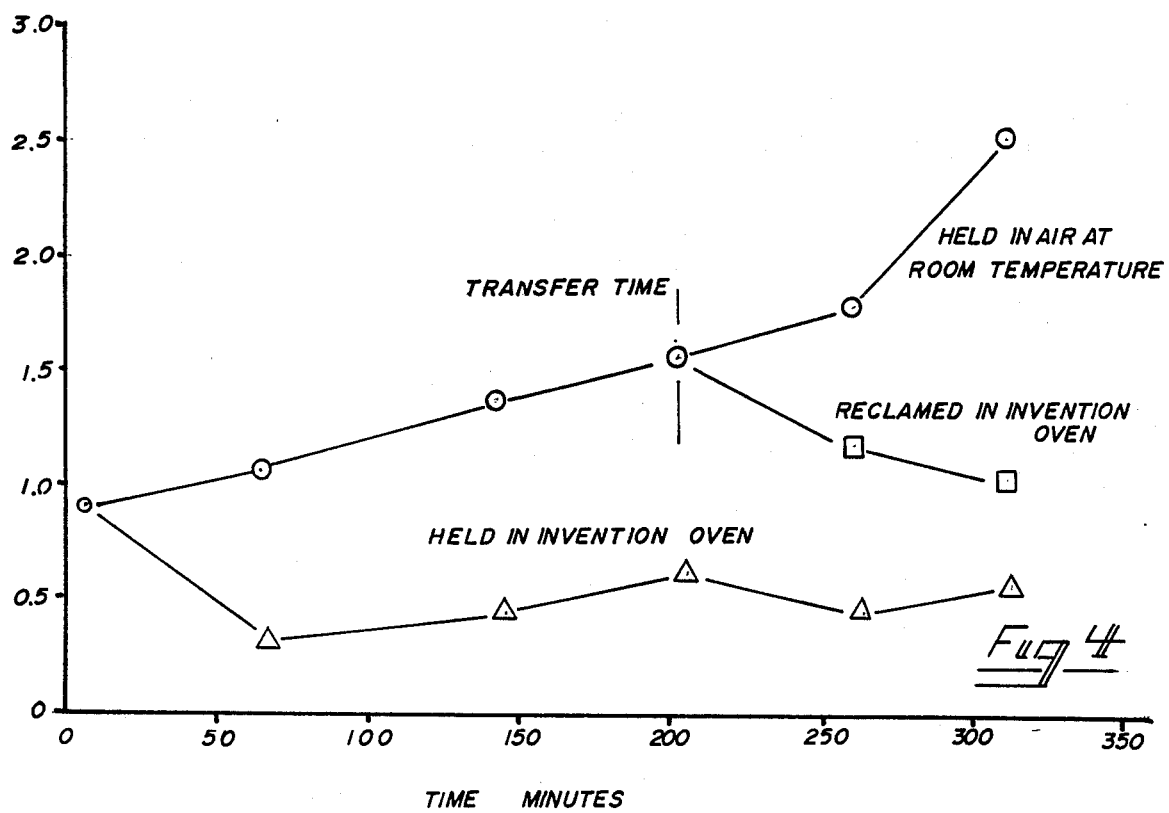

COOKING TREATMENT PROCESS

BACKGROUND OF THE INVENTION

The present invention relates, in general, to cooking processes and processes for holding or reclaiming cooked food.

Devices useful in accordance with the present invention are shown and described in copending U.S. patent, application Ser. No. 521,344 filed 8/8/83, now U.S. Pat. No. 4,623,780, an example of equipment for controlling rate of evaporation of water from a reservoir or "evaporator" into an enclosure and means for simultaneously controlling the temperature of the atmosphere within the enclosure to facilitate processing, holding, or reclaiming of food products.

Prior art examples teach means for controlling humidity of an enclosure and in some instances the temperature and the humidity of the enclosure to provide a congenial atmosphere for the storage of food products, or other materials such as biologically active materials.

Further, the prior art teaches that the maintenance of humidity in a food enclosure can in some instances be important in the maintenance of food quality; however, no prior art reference is known which teaches the control of air temperature and water temperature in a reservoir in communicative relation with the food enclosure.

Additionally, no prior art reference is known which teaches methods or processes for cooking food wherein the temperature of the atmosphere within a stationary enclosure, and the temperature of water in a reservoir in communication with the same enclosure are varied over a selected period of time in selected relationship in order to achieve a desired result in the food being cooked.

One known prior art reference U.S. Pat. No. 2,318,027 Sykes teaches a dehydration device where temperature and humidity are controlled in an enclosure by sensing wet bulb and dry bulb temperatures and spraying steam into a water reservoir to increase humidity. The use of heaters to maintain selected water reservoir temperature is not taught.

Another prior art reference, U.S. Pat. No. 3,245,461 Allington, teaches a control arrangement to maintain humidity by monitoring wet bulb and dry bulb temperatures where cooling or heat is supplied to a water reservoir in response to change in wet bulb and dry bulb temperature. Nowhere does the reference recognize the value of the use of the reservoir temperature as a means of controlling the treatment of food.

U.S. Pat. No. 3,518,949 Stock teaches an arrangement for conditioning dough etc. where a first control is provided to control air temperature in an enclosure by operation of a heater, second temperature control means are provided to limit the maximum temperature adjacent the heater and a humidity responsive switch is provided to energize a heater in a water reservoir to vaporize water to adjust humidity. Stock like Allington and Sykes does not teach control of the water temperature. Additionally, Luce U.S. Pat. No. 2,939,423 controls humidity by controlling temperature of the air and water but does not independently control air and water temperature. U.S. Pat. No. 3,424,231 teaches controlling air and water temperatures and spraying the water into the airstream supplied to an enclosure.

U.S. Pat. No. 4,244,979 Rodenick teaches a food handling device where vapor is supplied to a cabinet but only the air is heated and a two stage processing procedure is disclosed.

SUMMARY OF THE INVENTION

The present invention relates, in general, to food processing, holding, and reclaiming process as discussed hereinafter.

More particularly the present invention is directed to processes for accomplishing the objective of treating food products by holding, cooking, or reclaiming, various general types of food and the general and specific conditions required to accomplish such objectives.

The present invention is directed to a variety of food holding and processing situations. For example, it has been found that biscuits once prepared may become unmarketable only 30 minutes after the preparation because of the nature of the product. The rather short "as baked" time period requires great predictability of demand in order to maintain uniform quality of product delivered to customers.

The present invention also recognizes that preserving food flavor and texture is a function not only of temperature but also of moisture content of the food and that conventional ovens and warmers, which are designed to hold prepared food by circulating heated air over the product, can severely desiccate the foods to the detriment of the quality.

Accordingly, the present invention provides separate controls for heating air and water in a reservoir in communication with the food holding enclosure to create environments which are conducive to holding, cooking, and reclaiming a variety of products in accordance with the optimum moisture requirements of the food at the temperature to be maintained.

Because of the the simultaneous control of air temperature and temperature of water in a reservoir communicating with the enclosure in accordance with the present invention it is possible to cook and hold food products with less shrinkage than even in low temperature ovens, and much less shrinkage than occurs in similar foods processed and held in conventional forced draft ovens.

Various processes within the scope of the present invention are illustrated in the accompanying drawings and described hereinafter but it will be understood that the illustrations and descriptions given hereinafter are not by way of limitation and various other processes and methods also within the scope of the present invention will occur to those skilled in the art upon reading the disclosure set forth hereinafter.

BRIEF DESCRIPTIONS OF THE DRAWINGS

Figure 5:
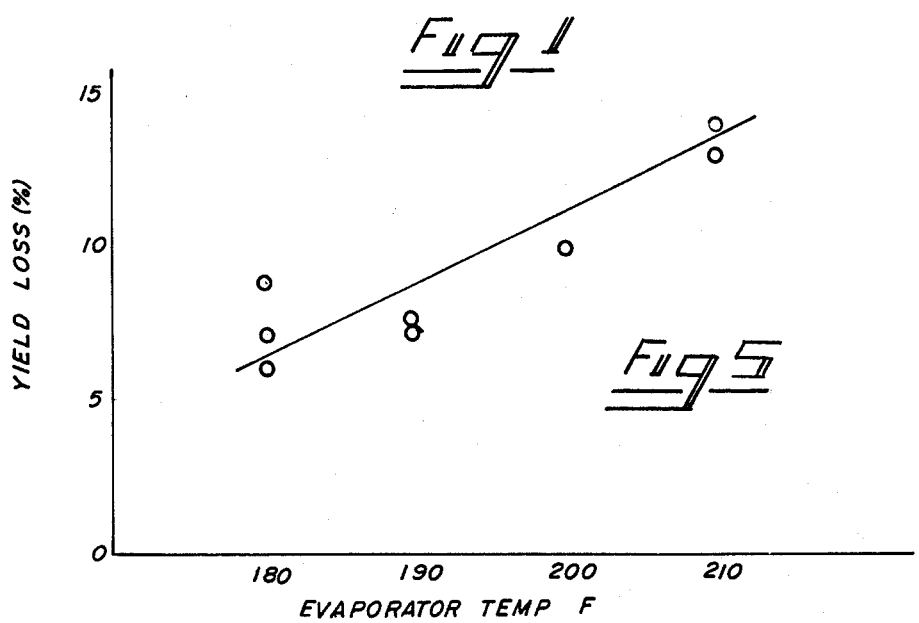
Figure 6:
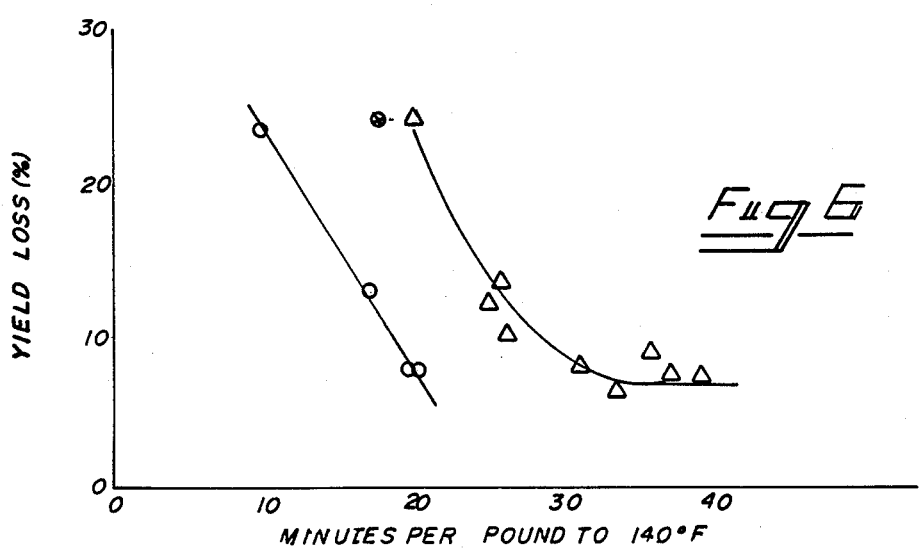

In the illustrations accompanying the present application;

FIG. 1 is schematic illustration of one example of a device to accomplish methods and processes within the scope of the present invention;

FIGS. 2A–2C graphically illustrate data for holding of bakery products according to processes within the scope of the present invention;

FIG. 3 graphically presents data reflecting recovery of staled biscuits in processes in acordance with the present invention;

FIG. 4 graphically presents data reflecting recovery of staled bread in processes in accordance with the present invention;

FIG. 5 graphically illustrates the effect of evaporator temperature on weight loss in meat with the present invention and compares this with other ovens; and FIG. 6 graphically illustrates the effect of evaporator temperature on cooking time of meat in processes in accordance with the present invention.

DETAIL DESCRIPTION OF THE DRAWINGS

FIG. 1 is an illustration of one example of a device useful in carrying out processes within the scope of the present invention. An enclosure 1 is provided, which can have a door (not shown) to provide access to the interior of the unit, which contains shelves 7 adapted to hold food 6 to be treated. In the arrangement shown vertical baffles 2 are affixed parallel to and spaced from the side walls of the cabinet 1, and air heaters 3 are provided in the space between the baffles 2 and wall member 20.

A first temperature probe 16 is provided to sense the air temperature within enclosure 1 and is attachable to a first temperature controller 17 which regulates power by lines 18 to air heaters 3.

Also within the scope of the present invention, a reservoir or "evaporator" 8 is provided to receive water 9, which is vaporized by water heater 11. Water heater 11 is supplied with power by means of leads 14 from a second controller 13 which operates in response to temperature sensed by a second temperature probe 12 emersed in the water 9.

Thus, control of the air temperature and the water temperature can be utilized to control the relative humidity of the air and temperature of the air within the cabinet to provide the novel and unexpected results achieved by processes of the present invention.

In one example of a process within the scope of the present invention, bakery products, specifically biscuits, were to be maintained in the "as baked" condition utilizing various test procedures and equipment.

In this case three 10-biscuit packages of refrigerated buttermilk biscuits were baked as a single lot in a domestic range. The oven setting was 475° F. and the baking time was 14 minutes. The baked biscuits were randomly distributed into three sublots of 10 biscuits each and immediately transferred to the following holding conditions:

Sublot #1: Held at room temperature with full exposure to laboratory air.

Sublot #2: Held in commerical holding cabinet at 180° F. air temperature.

Sublot #3: Held in a Vapor Oven utilizing invention process at 170° F. evaporator temperature and 180° F. air temperature.

The intact biscuits were placed in the various holding situations at zero time for the holding experiment. Single biscuits were taken periodically from each sublot and tested for compressability of the internal crumb; resistance to compression is the testing mode normally used for objective texture measurements on baked food products.

Immediately after removal from the holding situations, each biscuit was sectioned parallel to its base at a height ⅜ inch above the base. The bottom portion of the biscuit was then immediately positioned on the compression fixture of an Instron ™ Tester and compressed to 50% of its original thickness with a circular anvil (1.40 inch diameter) driven downward into the biscuit crumb at a rate of 2 inches per minute. The recorder of the Instron ™ Tester automatically traced the full compression curve and gave the peak compression force and the peak compression forces were tabulated in Table I as a function of holding time and holding conditions;

TABLE I

| Holding Environment | Holding Time (minutes) | Peak Compression Force (pounds) |
|---|---|---|
| Lab air exposure @ room temperature | 3 (as baked) | 1.19 |
| | 45 | 1.64 |
| | 75 | 2.20 |
| | 119 | 2.03 |
| | 180 | 2.55 |
| | 240 | 2.61 |
| Commerical Holding Cabinet 180° F. Air Temperature. | 15 | 1.44 |
| | 46 | 1.68 |
| | 77 | 2.16 |
| | 121 | 7.50 |
| | 181 | >10.0 (off scale) |
| Invention Vapor Oven 170° F. Evap. Temp. 180° F. Air Temperature | 18 | 1.01 |
| | 48 | 1.12 |
| | 79 | 1.21 |
| | 123 | 1.29 |
| | 183 | 1.12 |
| | 243 | 1.24 |
| | 310 | 1.41 |

Crush resistance of the intact biscuits was also measured after four hours aging in the two temperature controlled cabinets with the following results:

TABLE II

| Holding Environment | Peak Crush Force for 50% Compression |
|---|---|
| Commercial Holding Cabinet @ 180° F. Air Temperature | 26.2 pounds<br>36.8 pounds |
| Invention Vapor Oven 170° Evap. Temperature 180° Air Temperature | 1.5<br>1.3 |

The data on compression force as a function of holding time are shown graphically in FIGS. 2A-2C. The data shows that there was essentially no change in the compressive resistance, i.e., staling, of biscuits held according to the Invention Process. In the worst case after five hours of holding in the Invention Process, the peak compression force was only 18% higher than for the "as baked" biscuit. For the biscuits held in the commercial cabinet there was a 530% increase in staling in two hours. Tne holding cabinet can be considered as typical of the whole class of "heat only" holding cabinets not having any provision for simultaneous water vapor and temperature control.

The crushing experiment run on the biscuits aged four hours is even more dramatically indicative of the difference in holding conditions. The biscuits from the commercial holding cabinet gave brittle fracture and crumbled to powery fragments on compressing to 50% of tneir initial thickness. The biscuits from the Invention Process were soft, pliable, and completely elastic and returned immediately to their original shape on removal of the compressive load.

It has also been found that processes within the scope of the present invention can be used to reclaim bakery products which have become partially staled. The ability of processes within the scope of the present invention as to bakery product reclamation were demonstrated in a set of tests wherein a batch of Buttermilk biscuits were baked as a single lot in a domestic range for 14 minutes at 475° F. Two sublots of 12 biscuits each were randomly selected and transferred immediately to the following holding conditions:

Sublot #1: Held in a "heat only" commercial holding cabinet at 180° F. air temperature.

Sublot #2: in the Invention Vapor Oven at 170° F. Evaporator Temperature and 180° F. Air Temperature.

The remaining six biscuits were exposed to the laboratory atmosphere at room temperature.

An additional demonstration of the utilization of processes within the scope of the present invention for the reclamation of staled bakery products was provided from measurements on enriched white bread.

Loaves of enriched white bread were opened and the six end slices from each loaf were discarded. The remaining 15 center slices from each loaf were spread on corrugated stainless steel trays.

One tray of bread slices was transferred to an oven within the scope of the present invention preheated to 165° F. evaporator temperature and 180° F. air temperature in accordance with the present invention. The other two trays were allowed to stand exposed to the laboratory atmosphere at room temperature. Bread slices were taken periodically from each holding tray and tested for peak force using a circular anvil of 1.404 inch diameter positioned so as to compress the center of the slice.

The peak compression force data are tabulated in Table II for both biscuits and bread as a runction of holding time and conditions.

TABLE II

| Holding Environment | Biscuit Data: Holding time (minutes) | Peak Compressive Force (pounds) | |
|---|---|---|---|
| Lab air exposure at room temperature | 3 | 1.19 | As Baked |
| | 37 | 1.56 | |
| | 42 | 1.98 | |
| | 43 | 1.74 | |
| | 45 | 1.73 | |
| Invention Process Evap. Temp 170° F. Air Temp 180° F. | 62 | 1.15 | |
| | 63 | 1.00 | |
| | 105 | 1.27 | |
| | 106 | 1.06 | |
| | 161 | 0.96 | |
| | 175 | 0.98 | |
| Commercial Holding Cabinet 180° F. Air Temperature | 60 | 2.74 | |
| | 60 | 2.70 | |
| | 91 | 7.43 | |
| | 93 | 4.84 | |
| | Reclamation Time (min.) | | |
| After aging for 90 minutes in commercial holding cabinet; then transferred | 0 | 6.14 | |
| | 30 | 2.10 | |
| | 62 | 1.99 | |
| | 68 | 2.63 | |

TABLE II-continued to Invention Process Oven for reclamation.

| Holding Environment | Bread Data: Holding time (minutes) | Peak Compressive Force (pounds) | Comments |
|---|---|---|---|
| Lab atmosphere at room temperature | 6 | .73 | Represents Package Fresh values. |
| | 7 | .75 | |
| | 8 | .93 | |
| | 68 | 1.06 | |
| | 69 | .85 | |
| | 140 | 1.34 | |
| | 142 | 1.16 | |
| | 204 | 1.46 | |
| | 205 | 1.53 | |
| | 260 | 1.70 | |
| | 320 | 2.48 | |
| Invention Process Evap. Temp 165° F.° Air Temp 180° F. | 70 | .31 | |
| | 143 | .44 | |
| | 206 | .63 | |
| | 264 | .50 | |
| | 324 | .60 | |
| | Reclamation Time (min.) | | |
| Air aged 210 min; then transferred to Invention Process Oven for reclamation | 52 | 1.08 | |
| | 112 | .92 | |

The compressional resistance data for both biscuits and bread are shown graphically in FIGS. 3 and 4, respectively and support the conclusions that:

(1) Fresh bakery products as exemplified by biscuits and white bread can be held essentially indefinitely without change in the Invention Oven processes.

(2) Holding in a heat-only cabinet without water vapor control as exemplified by the Commerical Holding Cabinet leads to rapid and extreme staling in less than one hour.

(3) Bakery products which have been partially staled as by several hours of air exposure can be effectively reclaimed to acceptable levels of freshness by treatment by the Invention processes.

Processes within the scope of the present invention are also useful in the cooking of meat and in this connection a series of cooking runs were completed for prime rib roasts in a vapor oven in accordance with the present invention. Yield losses and cooking times to a 140° F. internal temperature were carefully monitored for small (6 pound) and large (17 pound) rib roasts. Comparison runs were made in processes in accordance with the present invention under a wide range of air and water temperature settings as well as with a typical commercial low temperature, slow cook oven and a typical forced draft electric convection oven.

The basic time and yield data for the various roasts, all cooked to a 140° F. internal endpoint, are summarized in Table III.

TABLE III

Cooking Times and Yield Losses for Prime Rib Roasts.

| Cooking Conditions | | Yield Data | | | | Time Data | |
|---|---|---|---|---|---|---|---|
| | Air/Water | Initial Wt. | Final Wt. | Loss Wt. | Loss % | Cook Time (min) | Min. per Pound |
| Inven. Proc. | 210/210 | 17.50 | 15.15 | 2.35 | 13.4 | 298 | 17.0 |
| Inven. Proc. | 210/190 | 17.60 | 16.25 | 1.35 | 7.7 | 343 | 19.5 |
| Convec. Oven | 350/— | 16.80 | 12.90 | 3.90 | 23.2 | 207 | 12.3 |
| Lo Temp Oven | 250/— | 17.10 | 15.75 | 1.35 | 7.9 | 347 | 20.3 |
| Inven. Proc. | 210/210 | 5.70 | 4.90 | .80 | 14.0 | 145 | 25.4 |
| Convec. Oven | 350/— | 5.80 | 4.40 | 1.40 | 24.1 | 112 | 19.3 |
| Lo Temp Oven | 250/— | 5.50 | 5.10 | .40 | 7.3 | 211 | 38.4 |

TABLE III-continued
Cooking Times and Yield Losses for Prime Rib Roasts.

| Cooking Conditions | | Yield Data | | | | Time Data | |
|---|---|---|---|---|---|---|---|
| | Air/Water | Initial Wt. | Final Wt. | Loss Wt. | Loss % | Cook Time (min) | Min. per Pound |
| Inven. Proc. | 200/180 | 5.75 | 5.25 | .50 | 8.7 | 200 | 34.8 |
| Inven. Proc. | 220/180 | 5.70 | 5.35 | .35 | 6.1 | 191 | 33.5 |
| Inven. Proc. | 220/190 | 6.10 | 5.65 | .45 | 7.4 | 188 | 30.8 |
| Inven. Proc. | 220/200 | 5.30 | 4.65 | .65 | 12.3 | 132 | 24.9 |
| Inven. Proc. | 240/200 | 5.90 | 5.30 | .60 | 10.2 | 159 | 26.9 |

Tests were run to investigate the effects of various cycles for cooking of bottom round roasts in accordance with the invention and to compare performance versus that for similar roasts in dry ovens.

A series of cooking runs were completed for 10 pound Roasts in a microprecessor controlled Oven in accordance with the present invention with comparison runs in the Alto Shaam Model 1000-TH-II commercial slow cook oven and the Hotpoint domestic range oven. All roasts, except in the Hotpoint Oven were cooked to a 160° F. internal end point with data noted on yield loss, cooking time, power consumption, and subjective evaluations of appearance and texture. The results are summarized in Table IV.

evaporator temperature. On a time per pound basis, the oven operated in accordance with the present invention where heat is supplied to air and water compares favorably with a dry heat oven where heat is only supplied to the air.

In general, in conventional dry roasting of meats, without subsequent holding, the internal, centerline temperatures for various doneness levels are generally accepted as follows:

| Rare | 136–140° F. |
|---|---|
| Medium rare | 151–154° F. |
| Medium | 163–167° F. |
| Well done | 176–180° F. |

TABLE IV
Summary of Data for Bottom Round Meat Cooking

| Run No. | Oven | Evap Temp | Air Temp | EP Temp | Init. Wt. | Final Wt. | Wt. Loss | % Loss | Min To EP (1) | Min lb. | Power consumed KWH |
|---|---|---|---|---|---|---|---|---|---|---|---|
| (1) | Hotpoint TM | N/A | 325 | 165 | 9.80 | 6.20 | 3.60 | 36.73 | 184.00 | 18.78 | N/A |
| (2) | Alto Shaam TM | N/A | 250 | 160 | 8.70 | 6.20 | 2.50 | 28.74 | 293.00 | 33.68 | N/A |
| (3) | Inven. Process | 180 | 220 | 160 | 9.90 | 7.60 | 2.60 | 23.23 | 293.00 | 29.60 | 2.34 |
| (4) | Inven. Process | 190 | 220 | 160 | 10.30 | 7.70 | 2.60 | 25.24 | 275.00 | 26.70 | 2.61 |
| (5) | Inven. Process | 200 | 220 | 160 | 11.20 | 8.20 | 3.00 | 26.79 | 259.00 | 23.13 | 2.87 |
| (6) | Inven. Process | | | | | | | | | | |
| | (a) Cook | 180 | 220 | 145 | | | | | | | |
| | (b) Brown | 90 | 250 | 160 | 10.30 | 8.00 | 2.30 | 22.33 | 319.00 | 30.97 | 2.40 |

(1) EP = minutes to end point is time for transition of internal temperature from 40 to 160° F.

The general appearance of the roast from Run 6 was decidedly the best of those cooked in accordance with the present invention. The external fat was nicely browned to a golden color. The interior doneness was medium-well with a moderately tender, but chewy texture. The roast was quite juicy and had a good, meaty flavor.

In general, the test results provided the conclusion that:

(1.) Temperature of the water in the resevoir appears to be the dominant factor in control of cooking time and yield losses for meat cooking in accordance with the present invention.

(2.) While air temperature is less critical, air heater setting 30° to 40° F. higher than the evaporator setting is preferred.

(3.) Surface browing, especially for any exposed fat cap, is favored by a profiled cycle in which the roast is finished to its final internal end point with the difference between air temperature and water temperature increased.

The results further indicate in FIG. 5 that weight loss during cooking increases slowly as water temperature is increased. However, all of the roasts cooked in processes in accordance with the present invention had less weight loss than for the roasts cooked in either of the dry ovens.

FIG. 6 shows that cooking time in minutes per pound to a 160° F. internal end point decreases with increasing It was noted that in some cases roasts cooked and held in the vapor ovens operated in accordance with the present invention, have gone beyond the rare doneness state when using the conventional 140° F. end point for terminating the cooking phase.

Tests were run to quantify the temperature rise occuring during holding and standing, and from these experimental measurements end point temperatures were found to assure the rare doneness state for roasts cooked and held in ovens in accordance with the present invention. In all cases the roast temperatures both internally and at the surface were monitored during the holding periods following cooking.

From the data, preferred internal cooking end points were defined which take into account the temperature rise which occur on holding or during standing as shown in Table V.

TABLE V

| Internal End Point Temperatures | | | |
|---|---|---|---|
| | RARE | MEDIUM | WELL DONE |
| For roasts to be held in Invention Process for 1 to 3 hours | 125° F. | 150° F. | 165° F. |
| For roasts to be cut and | 135° F. | 160° F. | 175° F. |

TABLE V-continued

| | Internal End Point Temperatures | | |
|---|---|---|---|
| | RARE | MEDIUM | WELL DONE |
| served without holding | | | |

The end points above were based on the data shown in Table VI.

TABLE VI

Holding conditions, Internal Temperature Rise, and Doneness.

| Run No. | Holding Conditions | | Time | Final Temp °F. | Temp Rise °F. | Doneness |
|---|---|---|---|---|---|---|
| (1) | In Inven. Proc. | 140 Evap 155° F. Air | 2 hrs | 153 | 23 | Medium Rare |
| (2) | In Inven. Proc. | 140 Evap 155° F. Air | 2 hrs | 148 | 23 | Rare |
| (3) | Stand in | Air 70° F. | 53 min | 147 | 12 | Rare |
| (4) | Stand in | Air 70° F. | 50 min | 137 | 7 | Very Rare |

It follows that the processes in accordance with the present invention can be adapted to give high yields in meat cooking which are fully comparable to those obtainable in a low temperature slow cook oven. In general, it has been unexpectedly found that the water temperature appears dominant in control of yield losses in processes in accordance with the present invention and an evaporator setting of 180° F. or less appears to be preferred to obtain maximum yield. The air temperature setting appears less critical, but preferably should be set 30–50° F. higher to favor surface color development (browning). Among the examples, it appears that preferred yield and browning were obtained at settings of 180° F. evaporator and 220° F. air.

Although the evaporator temperature appears to be the dominant factor in processes in accordance with the present invention for low loss meat cooking, time and air temperature are also important. It is also shown that slow cooking, i.e., long cooking time, is required in order to obtain low yield losses. Longer cooking times are obtained as water temperature is reduced.

Another series of cooking runs was performed using processes within the scope of the present invention applied to small prime rib roasts. The profiled test cycles generally involved cooking to an internal temperature less than the final end point with both the evaporator and air heaters functional; the cook cycles were then finished to the final end point with air heat only to encourage surface browning.

The test data for the various roasts all cooked to a final 140° F. end point with the reset to "air heat only" effected at an internal temperature of 130° F. are summarized in Table VII.

TABLE VII

| Run No. | | Profiled Cook Settings | | | Yield Data | | Time Data | | Power Consumption | |
|---|---|---|---|---|---|---|---|---|---|---|
| | | Air F | Evap F | To End Point F | Initial Weight lbs. | % Loss % | To 130° min. | To 140° min. | To 130° KWH | Total 140° KWH |
| 1 | (a) | 220 | 180 | 140 | 6.00 | 10.0 | — | 198 | — | 1.43 |
| 4 | (a) | 220 | 180 | 140 | 6.10 | 9.8 | — | 195 | — | 1.43 |
| 2 | | 220 | 180 | 130 | | | | | | |
| | | 250 | 90 | 140 | 5.85 | 12.8 | 168 | 189 | 1.39 | 1.56 |
| 3 | | 220 | 180 | 130 | | | | | | |
| | (b) | 250 | 90 | 140 | 6.20 | 9.7 | 160 | 185 | 1.16 | 1.40 |
| 5 | | 210 | 210 | 130 | | | | | | |
| | | 250 | 90 | 140 | 6.00 | 16.7 | 128 | 143 | 1.71 | 1.96 |

(a) control runs without profiling
(b) drained evap. at reset point

It is understood that the foregoing are but a few examples of process with in the scope of the present invention and various other processes also within the scope of the present invention will occur to those skilled in the art upon reading the disclosure set forth hereinbefore.

The invention claimed is:

1. A method for cooking or holding food product at an elevated temperature above ambient temperature in a treating device including an enclosure to hold said food product; air heater means to selectively supply heat to air in said enclosure; evaporator means to hold water which is evaporated into said enclosure, and water heater means to supply heat to said water in said evaporator means; first control means controlling said air heater means and second control means controlling said water heater means to maintain selected air temperature and water temperatue where said method includes placing said food product in said enclosure maintaining a first air temperature and a first water temperature in a first stage for a first time period where said first control means controls said air temperature at first air temperature level and said second control means controls said water temperature at a first water temperature less than said first air temperature then cooking or holding said food product at an elevated temperature above ambient temperature during a second stage for a second period of time by changing at least one of said air temperature and said water temperature.

2. The method of claim 1 including changing said at least one of said air temperature and said water temperature during said second stage to provide lower relative humidity in said enclosure than during said first stage.

3. The method of claim 2 wherein during said second stage said air temperature is increased at a selected rate during a selected period of time.

4. The invention of claim 1 wherein said food product is a meat.

5. The invention of claim 1 wherein said food product is a vegetable.

6. The invention of claim 1 wherein said food product is a bakery product.

7. A method of cooking or holding food product at an elevated temperature above ambient temperature in a treating device which includes an enclosure to hold said food product; air heater means to selectively regulate the air temperature in said enclosure; evaporator means to hold water to be evaporated into said enclosure; water heater means to selectively regulate water temperature in said evaporator means to control rate of water evaporation; first control means responsive to air temperature to control power supplied to said air heater means and second control means responsive to water temperature to control power supplied to said water heater means; food temperature measuring means to be received by said food product to measure a temperature of said food product at a selected location within said food product where said method includes locating said food product in said enclosure and maintaining said air temperature in said enclosure at a first air temperature and maintaining said water temperature in said reservoir at a first water temperature during a first stage for a first time period; then further cooking or holding said food product at an elevated temperature above ambient temperature in a second stage when said food temperature measuring means indicates a first selected food temperature by raising said air temperature to a second air temperature and maintaining said water temperature at a second water temperature for a second time period.

8. The method of claim 7 wherein said water temperature is maintained between 170° F. and 190° F. and said air temperature is maintained between 30° F. and 50° F. higher than said water temperature during said first stage, and said air temperature is maintained between 240° F. and 260° F. and said water heater is caused to be off during said second processing stage.

9. The method of claim 7 wherein said first stage is continued until said food temperature measuring means reaches a second food temperature and thereafter maintaining said air temperature between 240° F. and 260° F. and said water heater means is caused to be off during said second stage.

10. The method of claim 7 including selecting between said air temperature and said water temperature during said first stage to provide a higher relative humidity within said enclosure during said first stage and a lower relative humidity within said enclosure during said second stage.

* * * * *